July 8, 1969  T. S. MAYNER  3,453,690
VARIABLE AREA EXTRUDER DIE-HEAD
Filed May 26, 1967
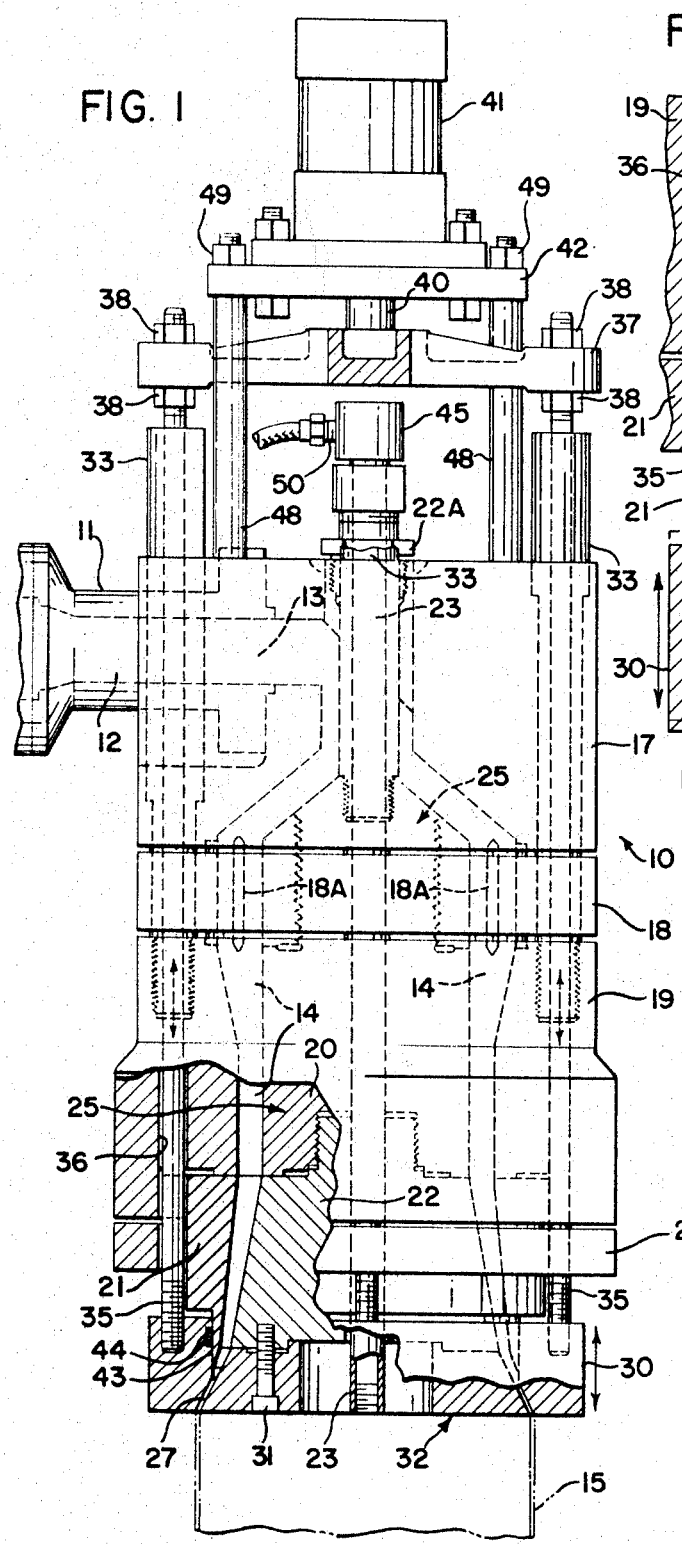
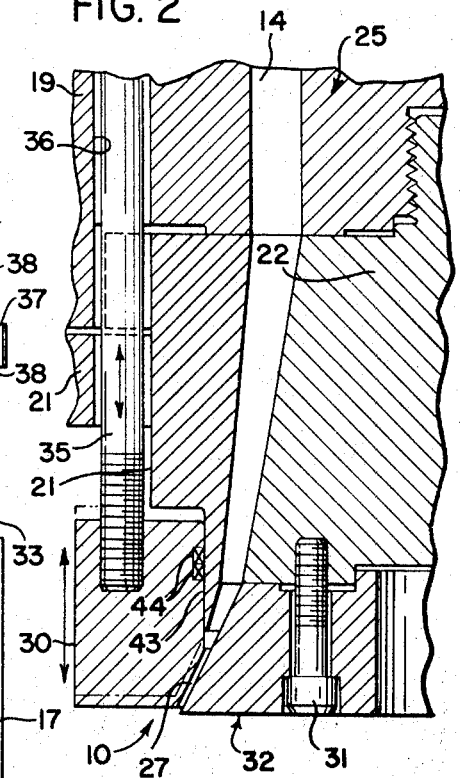
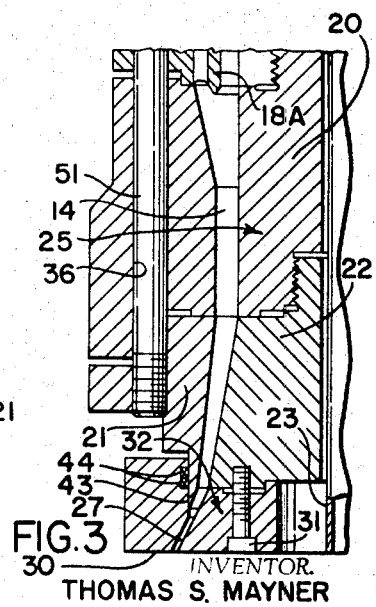
INVENTOR.
THOMAS S. MAYNER
BY
Irvin L. Groh
ATTORNEY

United States Patent Office 3,453,690
Patented July 8, 1969

3,453,690
VARIABLE AREA EXTRUDER DIE-HEAD
Thomas S. Mayner, Chagrin Falls, Ohio, assignor to Midland-Ross Corporation, Cleveland, Ohio, a corporation of Ohio
Filed May 26, 1967, Ser. No. 641,614
Int. Cl. B29d 23/04
U.S. Cl. 18—14                            6 Claims

ABSTRACT OF THE DISCLOSURE

A movable spaced outer ring, with a stationary inner member, constituting an extrusion nozzle in an extruder die-head is adapted to be movably supported relative the inner constituted mandrel with which it makes a variable area extruding orifice for plastic tubing.

---

This invention relates to variable area orifices of nozzles utilized with plastic extruders for the manufacture of plastic tubing, sheet or film. More particularly, the invention relates to an improved adjustable nozzle for varying the extrusion area of an orifice in a die-head, where the mandrel is fixed and where the outer die ring is relatively movable to the said mandrel.

The adjustable die-head to be described herein is advantageous and improved over known devices in that it is constructed in a manner which provides for mandrel stability in its fixed position and of the nozzle ring thus insuring wall thickness of an extruding cylindrical hollow body. The adjustment of the nozzle ring to the fixed mandrel can be quickly made almost immediately, providing for variations in wall thickness throughout an issuing tube's circumference. Advantages arise out of the fact that the mandrel is stationary and that it forms part of the die-head and where the sole moving means to effect a variable area of the nozzle is an outer ring or nozzle element.

An inherent advantage of such a die-head lies in its simpleness in construction, and the sturdy support of the outer movable nozzle element or die ring which provides for a minimum variation from established conditions determining the wall thickness of the extruded plastic tube. The construction and assembly of the die-head assures the nozzle's dimensional stability by the rigid all internal mandrel structure, resulting in resistance to varying pressures, also through the support of the outer movable orifice ring element relevant the mandrel. Perhaps the greatest advantage arises in that a minimum amount of force is required because of the projected area exposed to plastic pressure; and greater accuracy assured in movement of the annular ring forming the orifice of the die-head. The construction where the movable nozzle is radially supported for sliding movement naturally tends toward equalization of forces resulting in predetermined and thereafter constant tube wall thickness.

The aforesaid advantages and others will become apparent from the following description taken in connection with the accompanying drawing, where:

FIGURE 1 represents, in partial section, the assembled extruder die-head of this invention;

FIGURE 2 is a partial sectional detail of the die ring or nozzle outlet; and

FIGURE 3 is a fragmentary section of the lower die area showing the tie rod construction.

A requirement of a variable area orifice of a nozzle in an extruder die-head is stability of position during and after movement of one movable element relative of the other to provide for predetermined and constant wall thickness of a plastic tubing being extruded. Varying high pressures put out by an extruder of a thermoplast require offsetting sturdy construction and particular support of the mandrel and the outer shell in which it is supported and with which it forms a path for flowing plastic material. If the mandrel is movable then close dimensions must be maintained with its guiding and supporting structure to prevent any variation from its predetermined position from occurring. Similarly where the mandrel is separate and stationary in its support, and its supporting shell moves in a relative mannner, close dimensions must be maintained. Even where utmost care is taken in fabrication of a die-head where either the mandrel or outer shell move relative each other discrepancies tend to creep in and flowing pressures of the plastic force variations in position to occur producing noticeable variations in the wall thickness of an extruded tubing about its circumference.

Referring to FIGURES 1 and 2 of the drawing the assembled die-head 10 is shown in a joined state with an extruder outlet 11 so that its passage 12 is in line with the incoming die-head passage 13 for a thermoplast moving forwardly through and subsequently out of the extrusion nozzle head 10. As shown, the passage 13 in the die-head 10 changes direction by about 90° and becomes initially helically circular in flow which is then evened out by a circular flow straightening vane 18A of the interevening spider member 18 to finally emerge in desired thickness as a tube 15 formed by a predetermined narrow circular setting of the orifice formed by mandrel end 32 and outer ring 30.

The die-head 10 itself is formed of the several sections 17, 18, 19, 21, 22, mandrel 25, end 32 and the die ring 30. The cylindrical die-head supporting portion 17 is manufactured so as to be mountable about the extruder outlet 11 in a manner so as to merge the extruder outlet passage 12 with the inner die-head passage 13. Passage 13 subsequently evolves into a radially spreading, downwardly flowing annular passage 14, including in its length straightening vane 18A of the spider element or intermediate section 18. A flowing plastic is finally extruded as a completed flowing thin-walled cylinder prior to its emergence as a tube through the nozzle 30.

Depending on thermoplast solution characteristics, the die-head 10 can be long or short. Some plastics upon separation caused by the circular metal section as 18A between the mandrel and its outer shell during flow reunify quite readily in a short distance, others do not and leave undesirable striation lines indicating a union. Where it is desired to avoid such an appearance then a longer flow of a united thermoplast prior to extrusion is required. In the present invention that is not a problem but only one where constant wall thickness throughout a tube circumference is set and maintained and where a change in such wall thickness can be accurately and quickly effected. Since, as described, the present die-head generally is a combination of machined sections, each being a part of an overall design, their assembly provides a cylindrical path of varying diameter, the flow initially being split through a plurality of motion arresting vanes then combined after being aligned to straight-line flow substantially prior to the die ring forming the nozzle.

As shown in assembled form, the die-head 10 and mandrel 25 delineate a varying but circular flow path 14 for any thermoplast being forced out of the extruder 11. The mandrel 25 itself is formed of separate sections determining the flow path and for establishing rigidity. The path 14 starts at the conical top through the flow aligning ring or section 18 having the vane 18A, and about the lower sections 20 and 22. The mandrel is additionally stabilized by a threaded tube section 33 turned into its conical top and secured to the head by nut 22A. This upper conical section of the mandrel 25 is part of the lower (mandrel) section 20 and the spider containing the ring 18A section is threaded thereabout. The lower end of section 20 of the mandrel also is threaded, as shown, forming a receiving recess for the threaded portion 22. The final section 32 forming the inner part of the nozzle and terminal end of the mandrel is, as shown, secured to the section 22 by means of bolts 31. The cylindrical straightening vane 18A is supported by radial members (not shown) to form the spider unit as an integral part of the intermediate section 18. This section including the spider construction is threaded onto the mandrel part 25. The mandrel 25 through the spider section 18 threaded about its upper portion is then rigidly supported within the head.

Hollow-cored bolts 33 along with intermediate tie-bolts 51 (see FIGURE 3), turned into the sections 19 and 21, draw the various parts tightly together fixing the mandrel in position as well as making the die-head 10 rigid. The mandrel, thus, is held stable against movement where, possibly, a structure otherwise supported would not be. The varying flowing pressures of a thermoplast have practically no effect on the present mandrel nor on the outside die ring 30.

The mandrel 25 extends beyond the shell or housing 10 a distance required for a positioning thereabout of the nozzle ring 30, including the distance for its relative movement for various orifice openings. The die ring 30 is initially manufactured to generally conform with the outer terminal face 27 of the mandrel 25 since the two form the extruding nozzle and their relative positions determine the wall thicknesses of the extruding plastic. A change in position of the movable outer nozzle ring 30, of course, will change the thickness of the film wall. The mandrel extension 32 is a disc having an outer face with a taper about equivalent to the interface of the nozzle ring 30. It is secured to the mandrel 25 base by means of bolts 31 threaded into the mandrel element 22.

The nozzle ring 30 positioned about the mandrel end 32 and movable relative to the mandrel terminal face 27 is radially supported by a number of threaded bolts or rods 35 passing through provided drilled passages in the outer edge of the die-head 10, and through the cores of the hollow rods 33 that also passed through drilled paths in die sections 19 and 21. The ends of the rods 35 then are threaded into the die ring 30. As shown, the connecting rods or bolts 35 are radially spaced and may comprise as many as there are spider arms 37 supporting them, each rod 35 simultaneously moving when actuated in the rod cores 36 and other provided passages in the die-head into the die ring 30. In between the hollow core rods 33 are additional tie rods 51 (FIGURE 3) for holding the die-head sections together.

The upper or terminal ends of the die ring supporting rods 35 extend upwardly through the cores 36 and the hollow rods 33 secured to the arms of the spider element 37 attached to a hydraulic actuating device 41, being held therein by opposing nuts 38. The hollow rods 33 are of larger diameter at their upper portions to provide for shoulders that bear against the inner initial enlargement of the passages or cores 36. As already described, the tie bolts 51 and hollow bolts 33 by being threaded into sections 21 and 19 combine and hold together the various sections forming the die-head into a unitary and total element.

The bracket or spider 37 itself is secured to the end of a hydraulic actuated piston rod 40 shown extending from the cylinder 41. The cylinder 41 is mounted on and secured to a rigid support 42 resting on the die-head 10, supported and secured thereon by studs 48 turned in the head of section 17 (not shown) and nuts 49. Limits of motion of the nozzle ring 30 for thickness of tubing wall are determined by the positional adjustment means of shims and nuts 38 on either side of the spider arms 37 above the die-head, and acting on the hollow bolt 33 ends. For a change in thickness the upward movement is stopped by an abutting of shoulders provided by recessing of the base of section 22, and of the top of the ring 30. Below the spider there is positioned a cap 45 with an air entry 50 for pressurized air utilized in blowing out the extruding tube. The entry or air supply 50 joins the continuous passage or tube 23 within the stationary mandrel which then extends into the nozzle ring 30. While only two positions are attainable by the hereinshown exaggerated adjustments shown in FIGURE 1, either entirely downwardly when the nuts 38 rest on the bolt 33 ends or upwardly limited by the contact of nozzle ring 30 with the shoulder of section 21, obviously a cam arrangement can be provided and interset to establish an unlimited number of stops between such established limits.

A change in liquid pressure in opposing directions on the hydraulic cylinder 41 effects a movement of the cylinder rod 40 which then moves the spider 37 and the rods 35 secured thereby by the adjusting nuts 38 to reposition the nozzle ring relative the mandrel 25, thereby providing a change in wall thickness of an extruding tube. An even movement of the nozzle ring 30 is assured by initial adjustment of the radial plurality of rods 35 operating in the close dimensions required of their guideways in hollow rods 33; also, through further assurance of close relative dimensional control of the orifice ring 30 relative to the lip 43 of the terminal die-head assembled member 21. The sealing washers 44 in the nozzle ring 30 and positioned relative the face or the extended lip of the member 21 additionally provide a further stabilizer and act as seals against the escape of a thermoplast. Blowing of the emerging tube 15 is, generally, continuously done, as through the tube 23 which desirably is extended through the core of the final assembled element 32.

What is claimed is:

1. A variable area extruder die-head comprising, an outer shell having an inlet for thermoplastic material, a stationary mandrel positioned centrally therein, a passage in said die-head for said thermoplastic material about said mandrel formed by said mandrel and said shell, an outer movable orifice ring positioned about the outlet end of the mandrel and forming an outlet orifice therewith, said orifice ring being independently supported of said shell so as to be adapted to move relative the mandrel end to vary the orifice area, means for actuating said orifice ring being supported by the die-head, further connecting means of said actuating means with guide passages in said die-head shell, said orifice ring, and said actuating means through said connecting means being adapted to position said orifice ring relative the outlet section of said mandrel.

2. A variable area extruder die-head comprising, an outer shell having an inlet for thermoplastic material, a mandrel fixedly centrally positioned therein, a circular passage for said thermoplasaic material about said mandrel formed by said mandrel and said shell, an outer movable orifice ring about the outlet end of the mandrel, said orifice ring being independently supported of said shell being adapted to move relative the mandrel end, means for actuating said orifice ring supported by the die-head, guide passages radially spaced about in said die-head shell for orifice ring support rods, and support rods positioned about the mandrel and extending through said guide passages connecting said orifice ring to said actuating means and therethrough being adapted to raise or lower said ring relative the outlet section of said fixed mandrel.

3. A variable area extruder die-head comprising, an outer shell unit formed of several sections having an inlet for thermoplastic material, a mandrel spaced from the said shell and fixedly positioned therein, a passage for said thermoplastic material about said mandrel formed by said mandrel and said shell, a thermoplastic flow straightening means being part of one section forming the unit shell in said passage and about said mandrel, an outer movable orifice ring positioned about the outlet end of the mandrel for determining therewith the thickness of material flowing therethrough, said orifice ring being independently supported of said shell being adapted to move relative the mandrel end, means mounted on the die-head for actuating said orifice ring relative the mandrel end for change of position, tie-rods joining said actuating means with said ring, and said rods spaced about the mandrel and being adapted to raise or lower said ring relative thereto.

4. A variable area extruder die-head comprising, an outer shell unit formed of several sections, one section including flow straightening vanes, having an inlet for thermoplastic material, a mandrel within said shell defining a flow path therewith, said flow straightening vanes positioned about said mandrel and being connected thereto and to said shell, an outer orifice ring movable about the outlet end of the mandrel, said orifice ring being supported independently of said shell being adapted to move relative the mandrel end to form therewith a variable area orifice, means for moving said orifice ring relative the mandrel end being supported by the die-head, rods for joining said means extending through guide passages in said die-head shell and into said orifice ring, said rods being radially spaced about the mandrel in said guide passages, and means for determining the extent of movement of said orifice ring relative to the mandrel end.

5. A variable area extruder die-head comprising, an outer shell unit having an inlet for thermoplastic material, said unit shell being formed of several sections delineating internally a space for a mandrel, a mandrel being supported by lateral extensions forming one of said sections to thereby be fixedly positioned therein, a passage for said thermoplastic material about said mandrel formed by said mandrel and said shell unit, an outer movable orifice ring positioned about the outlet end of the mandrel, said orifice ring being independently supported of said shell and being adapted to move relative to the mandrel end to form a variable area orifice outlet, means for actuating said orifice ring supported by the die-head, guide passages in the outer portions of said die-head shell through which orifice ring support rods extend, rods spaced about the mandrel in said shell guide passages for connecting said orifice ring to said actuating means to raise or lower said ring relative the outlet section of said mandrel, stop means for said movable orifice ring, and an air supply passing through the said mandrel for expanding extruding material.

6. A variable area extruder die-head comprising, an outer shell unit having an inlet for thermoplastic material, said unit shell being formed of several sections delineating internally a space for a mandrel, said sections being secured as a unit shell by a plurality of tie-rods circularly positioned and extending through the various sections into the lowest, a mandrel being supported by one of said sections making it stationary, a passage for said thermoplastic material about said mandrel formed by said mandrel and said shell unit, flow straightening vanes in said passage also joining said mandrel supporting section and said mandrel, an outer movable orifice ring positioned about the outlet end of the mandrel, said orifice ring being independently supported of said shell and being adapted to move relative to the mandrel end to form a variable area orifice outlet therewith, means for actuating said orifice ring supported by the die-head, guide passages in the outer portions of said die-head shell through which orifice ring support rods extend, rods spaced about the mandrel in said die-head guide passages for connecting said orifice ring to said actuating means to raise or lower said ring relative the outlet section of said mandrel, limit stop means for said movable orifice ring, and an air supply passing through the said mandrel for expanding extruding material.

References Cited
UNITED STATES PATENTS

| | | |
|---|---|---|
| 1,768,671 | 7/1930 | Devin. |
| 1,914,689 | 6/1933 | Humphrey. |
| 2,821,745 | 2/1958 | Patton. |
| 3,144,682 | 8/1964 | Thulfold. |
| 3,209,404 | 10/1965 | Hagan. |
| 3,357,050 | 12/1967 | Criss. |
| 3,386,132 | 6/1968 | Fischer. |

WILLIAM J. STEPHENSON, *Primary Examiner.*